United States Patent
Longsdorf et al.

(10) Patent No.: US 7,630,861 B2
(45) Date of Patent: Dec. 8, 2009

(54) DEDICATED PROCESS DIAGNOSTIC DEVICE

(75) Inventors: Randy J. Longsdorf, Chaska, MN (US);
Scott D. Nelson, Plymouth, MN (US);
Dale S. Davis, Prior Lake, MN (US);
Richard L. Nelson, Chanhassen, MN (US); Amy K. Johnson, Plymouth, MN (US); Gregory C. Brown, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/440,582

(22) Filed: May 25, 2006

(65) Prior Publication Data
US 2007/0010968 A1 Jan. 11, 2007

Related U.S. Application Data

(63) Continuation-in-part of application No. 10/801,073, filed on Mar. 15, 2004, now Pat. No. 7,254,518, which is a continuation-in-part of application No. 09/852, 102, filed on May 9, 2001, now Pat. No. 6,907,383, which is a continuation-in-part of application No. 09/257,896, filed on Feb. 25, 1999, now abandoned, which is a continuation-in-part of application No. 08/623,569, filed on Mar. 28, 1996, now Pat. No. 6,017,143, said application No. 09/852,102 is a continuation-in-part of application No. 09/383,828, filed on Aug. 27, 1999, now Pat. No. 6,654,697, which is a continuation-in-part of application No. 09/257,896, filed on Feb. 25, 1999, now abandoned, which is a continuation-in-part of application No. 08/623,569, filed on Mar. 28, 1996, now Pat. No. 6,017,143.

(51) Int. Cl.
*G06F 11/30* (2006.01)

(52) U.S. Cl. ............... 702/183; 702/47; 702/65; 702/76; 702/104; 702/130; 702/140; 700/30; 700/48; 700/51; 700/54; 700/128; 370/41; 370/462; 370/465; 73/1.35; 73/861.11

(58) Field of Classification Search ............... 702/183, 702/33–34, 47, 65, 76, 104, 130, 140; 700/30, 700/48, 51, 54, 128; 370/410, 462, 465; 73/1.35, 861.11
See application file for complete search history.

(56) References Cited

U.S. PATENT DOCUMENTS 3,096,434 A 7/1963 King ........................ 235/151
(Continued)

FOREIGN PATENT DOCUMENTS

CA 999950 11/1976
(Continued)

OTHER PUBLICATIONS

Technical Information: HART Communication, Samson.*
U.S. Appl. No. 09/257,896, filed Feb. 25, 1999, Eryurek et al.
(Continued)

*Primary Examiner*—Tung S Lau
*Assistant Examiner*—Sujoy K Kundu
(74) *Attorney, Agent, or Firm*—Westman, Champlin & Kelly, P.A.

(57) ABSTRACT

A field mountable dedicated process diagnostic device is used for diagnosing operation of an industrial control or monitoring system. An input is configured to receive at least one process signal related to operation of the industrial process. A memory contains diagnostic program instructions configured to implement a diagnostic algorithm using the process signal. The diagnostic algorithm is specific to the industrial process. A microprocessor performs the diagnostic program instructions and responsively diagnoses operation of the process based upon the process signal.

32 Claims, 4 Drawing Sheets

U.S. PATENT DOCUMENTS

| | | | |
|---|---|---|---|
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,948,098 A | 4/1976 | Richardson et al. | 73/861.24 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,083,031 A | 4/1978 | Pharo, Jr. | 367/135 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,255,964 A | 3/1981 | Morison | 73/24.01 |
| 4,279,013 A | 7/1981 | Dahlke | 340/870.37 |
| 4,337,516 A | 6/1982 | Murphy et al. | 364/551 |
| 4,383,443 A | 5/1983 | Langdon | 73/290 |
| 4,390,321 A | 6/1983 | Langlois et al. | 417/15 |
| 4,399,824 A | 8/1983 | Davidson | 128/736 |
| 4,417,312 A | 11/1983 | Cronin et al. | 364/510 |
| 4,423,634 A | 1/1984 | Audenard et al. | 73/587 |
| 4,446,741 A | 5/1984 | Sirokorad et al. | 73/654 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,536,753 A | 8/1985 | Parker | 340/566 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,696,191 A | 9/1987 | Claytor et al. | 73/600 |
| 4,705,212 A | 11/1987 | Miller et al. | 236/54 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,866,628 A | 9/1989 | Natarajan | 700/102 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,047,990 A | 9/1991 | Gafos et al. | 367/6 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,369,674 A | 11/1994 | Yokose et al. | 376/245 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |

| | | | | | | | |
|---|---|---|---|---|---|---|---|
| 5,469,156 A | 11/1995 | Kogura | 340/870.38 | 5,825,664 A | 10/1998 | Warrior et al. | 700/7 |
| 5,469,735 A | 11/1995 | Watanabe | 73/118.1 | 5,828,567 A | 10/1998 | Eryurek et al. | 700/79 |
| 5,469,749 A | 11/1995 | Shimada et al. | 73/861.47 | 5,829,876 A | 11/1998 | Schwartz et al. | 374/1 |
| 5,481,199 A | 1/1996 | Anderson et al. | 324/705 | 5,848,383 A | 12/1998 | Yuuns | 702/102 |
| 5,481,200 A | 1/1996 | Voegele et al. | 324/718 | 5,854,993 A | 12/1998 | Crichnik | 702/54 |
| 5,483,387 A | 1/1996 | Bauhahn et al. | 359/885 | 5,854,994 A | 12/1998 | Canada et al. | 702/56 |
| 5,485,753 A | 1/1996 | Burns et al. | 73/720 | 5,859,964 A | 1/1999 | Wang et al. | 395/185.01 |
| 5,486,996 A | 1/1996 | Samad et al. | 364/152 | 5,869,772 A | 2/1999 | Storer | 73/861.24 |
| 5,488,697 A | 1/1996 | Kaemmerer et al. | 395/51 | 5,876,122 A | 3/1999 | Eryurek | 374/183 |
| 5,489,831 A | 2/1996 | Harris | 318/701 | 5,880,376 A | 3/1999 | Sai et al. | 73/861.08 |
| 5,495,769 A | 3/1996 | Broden et al. | 73/718 | 5,887,978 A | 3/1999 | Lunghofer et al. | 374/179 |
| 5,510,779 A | 4/1996 | Maltby et al. | 340/870.3 | 5,908,990 A | 6/1999 | Cummings | 73/861.22 |
| 5,511,004 A | 4/1996 | Dubost et al. | 364/551.01 | 5,923,557 A | 7/1999 | Eidson | 364/471.03 |
| 5,526,293 A | 6/1996 | Mozumder et al. | 364/578 | 5,924,086 A | 7/1999 | Mathur et al. | 706/25 |
| 5,539,638 A | 7/1996 | Keeler et al. | 364/424.03 | 5,926,778 A | 7/1999 | Pöppel | 702/130 |
| 5,548,528 A | 8/1996 | Keeler et al. | 364/497 | 5,934,371 A | 8/1999 | Bussear et al. | 166/53 |
| 5,551,306 A | 9/1996 | Scarpa | 73/86.16 | 5,936,514 A | 8/1999 | Anderson et al. | 340/310.01 |
| 5,555,190 A | 9/1996 | Derby et al. | 364/510 | 5,940,290 A | 8/1999 | Dixon | 364/138 |
| 5,560,246 A | 10/1996 | Bottinger et al. | 73/861.15 | 5,956,663 A | 9/1999 | Eryurek et al. | 702/183 |
| 5,561,599 A | 10/1996 | Lu | 364/164 | 5,970,430 A | 10/1999 | Burns et al. | 702/122 |
| 5,570,034 A | 10/1996 | Needham et al. | 324/763 | 5,995,910 A | 11/1999 | Discenzo | 702/56 |
| 5,570,300 A | 10/1996 | Henry et al. | 364/551.01 | 6,002,952 A | 12/1999 | Diab et al. | 600/310 |
| 5,572,420 A | 11/1996 | Lu | 364/153 | 6,006,338 A | 12/1999 | Longsdorf et al. | 713/340 |
| 5,573,032 A | 11/1996 | Lenz et al. | 137/486 | 6,014,612 A | 1/2000 | Larson et al. | 702/183 |
| 5,578,763 A | 11/1996 | Spencer et al. | 73/861.08 | 6,014,902 A | 1/2000 | Lewis et al. | 73/861.12 |
| 5,591,922 A | 1/1997 | Segeral et al. | 73/861.04 | 6,016,523 A | 1/2000 | Zimmerman et al. | 710/63 |
| 5,598,521 A | 1/1997 | Kilgore et al. | 395/326 | 6,016,706 A | 1/2000 | Yamamoto et al. | 9/6 |
| 5,600,148 A | 2/1997 | Cole et al. | 250/495.1 | 6,017,143 A * | 1/2000 | Eryurek et al. | 700/51 |
| 5,608,650 A | 3/1997 | McClendon et al. | 364/510 | 6,023,399 A | 2/2000 | Kogure | 361/23 |
| 5,623,605 A | 4/1997 | Keshav et al. | 395/200.17 | 6,026,352 A | 2/2000 | Burns et al. | 702/182 |
| 5,629,870 A | 5/1997 | Farag et al. | 364/551.01 | 6,038,579 A | 3/2000 | Sekine | 708/400 |
| 5,633,809 A | 5/1997 | Wissenbach et al. | 364/510 | 6,045,260 A | 4/2000 | Schwartz et al. | 374/183 |
| 5,637,802 A | 6/1997 | Frick et al. | 73/724 | 6,046,642 A | 4/2000 | Brayton et al. | 330/296 |
| 5,640,491 A | 6/1997 | Bhat et al. | 395/22 | 6,047,220 A | 4/2000 | Eryurek et al. | 700/28 |
| 5,644,240 A | 7/1997 | Brugger | 324/439 | 6,047,222 A | 4/2000 | Burns et al. | 700/79 |
| 5,654,869 A | 8/1997 | Ohi et al. | 361/540 | 6,052,655 A | 4/2000 | Kobayashi et al. | 702/184 |
| 5,661,668 A | 8/1997 | Yemini et al. | 364/550 | 6,061,603 A | 5/2000 | Papadopoulos et al. | 700/83 |
| 5,665,899 A | 9/1997 | Willcox | 73/1.63 | 6,072,150 A | 6/2000 | Sheffer | 219/121.83 |
| 5,669,713 A | 9/1997 | Schwartz et al. | 374/1 | 6,094,600 A | 7/2000 | Sharpe, Jr. et al. | 700/19 |
| 5,671,335 A | 9/1997 | Davis et al. | 395/23 | 6,112,131 A | 8/2000 | Ghoraishi et al. | 700/142 |
| 5,672,247 A | 9/1997 | Pangalos et al. | 162/65 | 6,119,047 A | 9/2000 | Eryurek et al. | 700/28 |
| 5,675,504 A | 10/1997 | Serodes et al. | 364/496 | 6,119,529 A | 9/2000 | Di Marco et al. | 73/861.68 |
| 5,675,724 A | 10/1997 | Beal et al. | 395/182.02 | 6,139,180 A | 10/2000 | Usher et al. | 374/1 |
| 5,680,109 A | 10/1997 | Lowe et al. | 340/608 | 6,151,560 A | 11/2000 | Jones | 702/58 |
| 5,682,317 A | 10/1997 | Keeler et al. | 364/431.03 | 6,179,964 B1 | 1/2001 | Begemann et al. | 162/198 |
| 5,682,476 A * | 10/1997 | Tapperson et al. | 370/225 | 6,182,501 B1 | 2/2001 | Furuse et al. | 73/49.2 |
| 5,700,090 A | 12/1997 | Eryurek | 374/210 | 6,192,281 B1 | 2/2001 | Brown et al. | 700/2 |
| 5,703,575 A | 12/1997 | Kirpatrick | 340/870.17 | 6,195,591 B1 | 2/2001 | Nixon et al. | 700/2 |
| 5,704,011 A | 12/1997 | Hansen et al. | 395/22 | 6,199,018 B1 | 3/2001 | Quist et al. | 702/34 |
| 5,705,754 A | 1/1998 | Keita et al. | 73/861.357 | 6,209,048 B1 | 3/2001 | Wolff | 710/62 |
| 5,705,978 A | 1/1998 | Frick et al. | 340/511 | 6,236,948 B1 | 5/2001 | Eck et al. | 702/45 |
| 5,708,211 A | 1/1998 | Jepson et al. | 73/861.04 | 6,237,424 B1 | 5/2001 | Salmasi et al. | 73/861.17 |
| 5,708,585 A | 1/1998 | Kushion | 364/431.061 | 6,260,004 B1 | 7/2001 | Hays et al. | 702/183 |
| 5,710,370 A | 1/1998 | Shanahan et al. | 73/1.35 | 6,263,487 B1 | 7/2001 | Stripf et al. | 717/1 |
| 5,710,708 A | 1/1998 | Wiegland | 364/470.1 | 6,272,438 B1 | 8/2001 | Cunningham et al. | 702/56 |
| 5,713,668 A | 2/1998 | Lunghofer et al. | 374/179 | 6,289,735 B1 | 9/2001 | Dister et al. | 73/579 |
| 5,719,378 A | 2/1998 | Jackson, Jr. et al. | 219/497 | 6,298,377 B1 | 10/2001 | Hartikainen et al. | 709/223 |
| 5,731,522 A | 3/1998 | Sittler | 73/708 | 6,307,483 B1 | 10/2001 | Westfield et al. | 340/870.11 |
| 5,736,649 A | 4/1998 | Kawasaki et al. | 73/861.23 | 6,311,136 B1 | 10/2001 | Henry et al. | 702/45 |
| 5,741,074 A | 4/1998 | Wang et al. | 374/185 | 6,317,701 B1 | 11/2001 | Pyotsia et al. | 702/188 |
| 5,742,845 A | 4/1998 | Wagner | 395/831 | 6,327,914 B1 | 12/2001 | Dutton | 73/861.356 |
| 5,746,511 A | 5/1998 | Eryurek et al. | 374/2 | 6,347,252 B1 | 2/2002 | Behr et al. | 700/2 |
| 5,747,701 A | 5/1998 | Marsh et al. | 73/861.23 | 6,356,191 B1 | 3/2002 | Kirkpatrick et al. | 340/501 |
| 5,752,008 A | 5/1998 | Bowling | 395/500 | 6,360,277 B1 | 3/2002 | Ruckley et al. | 9/250 |
| 5,764,539 A | 6/1998 | Rani | 364/557 | 6,370,448 B1 | 4/2002 | Eryurek et al. | 700/282 |
| 5,764,891 A | 6/1998 | Warrior | 395/200.2 | 6,377,859 B1 | 4/2002 | Brown et al. | 700/79 |
| 5,781,024 A | 7/1998 | Blomberg et al. | 324/763 | 6,378,364 B1 | 4/2002 | Pelletier et al. | 73/152.47 |
| 5,781,878 A | 7/1998 | Mizoguchi et al. | 701/109 | 6,396,426 B1 | 5/2002 | Balard et al. | 341/120 |
| 5,790,413 A | 8/1998 | Bartusiak et al. | 364/485 | 6,397,114 B1 | 5/2002 | Eryurek et al. | 700/32 |
| 5,796,006 A | 8/1998 | Bellet et al. | 73/661 | 6,405,099 B1 | 6/2002 | Nagai et al. | 700/159 |
| 5,801,689 A | 9/1998 | Huntsman | 345/329 | 6,425,038 B1 | 7/2002 | Sprecher | 710/269 |
| 5,805,442 A | 9/1998 | Crater et al. | 364/138 | 6,434,504 B1 | 8/2002 | Eryurek et al. | 702/130 |
| 5,817,950 A | 10/1998 | Wiklund et al. | 73/861.66 | 6,449,574 B1 | 9/2002 | Eryurek et al. | 702/99 |

| | | | | | | |
|---|---|---|---|---|---|---|
| 6,473,656 B1 | 10/2002 | Langels et al. ............... 700/17 | DE | 102 23 725 A1 | 4/2003 | |
| 6,473,710 B1 | 10/2002 | Eryurek ...................... 702/133 | EP | 0 122 622 A1 | 10/1984 | |
| 6,480,793 B1 | 11/2002 | Martin ......................... 702/45 | EP | 0 413 814 A1 | 2/1991 | |
| 6,492,921 B1 | 12/2002 | Kunitani et al. ............. 341/118 | EP | 0 487 419 A2 | 5/1992 | |
| 6,493,689 B2 | 12/2002 | Kotoulas et al. ............. 706/23 | EP | 0 512 794 A2 | 11/1992 | |
| 6,497,222 B2 | 12/2002 | Bolz et al. .................. 123/476 | EP | 0 594 227 A1 | 4/1994 | |
| 6,505,517 B1 | 1/2003 | Eryurek et al. ........... 73/861.08 | EP | 0 624 847 A1 | 11/1994 | |
| 6,519,546 B1 | 2/2003 | Eryurek et al. ............. 702/130 | EP | 0 644 470 A2 | 3/1995 | |
| 6,532,392 B1 | 3/2003 | Eryurek et al. ............. 700/54 | EP | 0 697 586 A2 | 2/1996 | |
| 6,539,267 B1 | 3/2003 | Eruyrek et al. ............. 700/51 | EP | 0 749 057 A1 | 12/1996 | |
| 6,546,814 B1 | 4/2003 | Choe et al. ............... 73/862.08 | EP | 0 825 506 A2 | 7/1997 | |
| 6,556,145 B1 | 4/2003 | Kirkpatrick et al. .... 340/870.17 | EP | 0 827 096 A2 | 9/1997 | |
| 6,564,268 B1 | 5/2003 | Davis et al. ................... 710/11 | EP | 0 838 768 A2 | 9/1997 | |
| 6,567,006 B1 | 5/2003 | Lander et al. ............... 340/605 | EP | 1 022 626 A2 | 10/1997 | |
| 6,594,603 B1 | 7/2003 | Eryurek et al. ............. 702/104 | EP | 0 807 804 A2 | 11/1997 | |
| 6,597,997 B2 | 7/2003 | Tingley ....................... 702/34 | EP | 1 058 093 A1 | 5/1999 | |
| 6,601,005 B1 | 7/2003 | Eryurek et al. ............. 702/104 | EP | 0 335 957 B1 | 11/1999 | |
| 6,611,775 B1 | 8/2003 | Coursolle et al. ............. 702/65 | EP | 1 022 626 A2 | 7/2000 | |
| 6,615,149 B1 | 9/2003 | Wehrs ......................... 702/76 | FR | 2 302 514 | 9/1976 | |
| 6,654,697 B1 | 11/2003 | Eryurek et al. ............... 702/47 | FR | 2 334 827 | 7/1977 | |
| 6,701,274 B1 | 3/2004 | Eryurek et al. ............. 702/140 | GB | 928704 | 6/1963 | |
| 6,727,812 B2 | 4/2004 | Sauler et al. ................ 340/511 | GB | 1 534 280 | 11/1978 | |
| 6,738,388 B1 | 5/2004 | Stevenson et al. ........... 370/465 | GB | 1 534 288 | 11/1978 | |
| 6,751,560 B1 | 6/2004 | Tingley et al. ............... 702/51 | GB | 2 310 346 A | 8/1997 | |
| 6,758,168 B2 | 7/2004 | Koskinen et al. ............... 122/7 | GB | 2 317 969 | 4/1998 | |
| 6,904,476 B2 | 6/2005 | Hedtke ....................... 710/72 | GB | 2 342 453 A | 4/2000 | |
| 6,915,364 B1 | 7/2005 | Christensen et al. ......... 710/104 | GB | 2 347 232 A | 8/2000 | |
| 7,040,179 B2 | 5/2006 | Drahm et al. .......... 73/861.356 | JP | 56-031573 | 3/1981 | |
| 7,058,542 B2 | 6/2006 | Hauhia et al. ............... 702/183 | JP | 57196619 | 2/1982 | |
| 7,099,852 B2 | 8/2006 | Unsworth et al. ............. 706/23 | JP | 58-129316 | 8/1983 | |
| 7,109,883 B2 | 9/2006 | Trimble et al. .......... 340/870.16 | JP | 59-116811 | 7/1984 | |
| 7,171,281 B2 | 1/2007 | Weber et al. ................. 700/96 | JP | 59-163520 | 9/1984 | |
| 7,254,518 B2 | 8/2007 | Eryrurek et al. ............. 702/183 | JP | 59-176643 | 10/1984 | |
| 2002/0013629 A1 | 1/2002 | Nixon et al. | JP | 59-211196 | 11/1984 | |
| 2002/0032544 A1 | 3/2002 | Reid et al. ................... 702/183 | JP | 59-211896 | 11/1984 | |
| 2002/0077711 A1 | 6/2002 | Nixon ......................... 700/19 | JP | 60-000507 | 1/1985 | |
| 2002/0108436 A1 | 8/2002 | Albuaijan .................... 73/168 | JP | 60-76619 | 5/1985 | |
| 2002/0121910 A1 | 9/2002 | Rome et al. ................. 324/718 | JP | 60-131495 | 7/1985 | |
| 2002/0145515 A1 | 10/2002 | Snowbarger et al. ......... 340/514 | JP | 60-174915 | 9/1985 | |
| 2002/0145568 A1 | 10/2002 | Winter ....................... 343/701 | JP | 62-30915 | 2/1987 | |
| 2002/0148644 A1 | 10/2002 | Schultz et al. ................. 175/39 | JP | 62-080535 | 4/1987 | |
| 2002/0194547 A1 | 12/2002 | Christenson et al. .......... 714/43 | JP | 62-50901 | 9/1987 | |
| 2003/0014536 A1 | 1/2003 | Christensen et al. ........ 709/238 | JP | 63-169532 | 7/1988 | |
| 2003/0033040 A1 | 2/2003 | Billings ....................... 700/97 | JP | 64-01914 | 1/1989 | |
| 2003/0045962 A1 | 3/2003 | Eryurek et al. | JP | 64-72699 | 3/1989 | |
| 2004/0078167 A1 | 4/2004 | Tan et al. ..................... 702/181 | JP | 11-87430 | 7/1989 | |
| 2004/0093174 A1 | 5/2004 | Lander ....................... 702/56 | JP | 2-05105 | 1/1990 | |
| 2004/0128034 A1 | 7/2004 | Lenker et al. ............... 700/282 | JP | 3-118424 | 5/1991 | |
| 2004/0199361 A1 | 10/2004 | Lu et al. ..................... 702/183 | JP | 3-229124 | 10/1991 | |
| 2004/0249583 A1 | 12/2004 | Eryurek et al. ............... 702/47 | JP | 4-70906 | 3/1992 | |
| 2005/0072239 A1 | 4/2005 | Longsdorf et al. ............ 73/649 | JP | 5-122768 | 5/1993 | |
| 2006/0075009 A1 | 4/2006 | Lenz et al. ................... 708/160 | JP | 6-95882 | 4/1994 | |
| 2006/0277000 A1 | 12/2006 | Wehrs ........................ 702/183 | JP | 06242192 | 9/1994 | |
| 2007/0010968 A1 | 1/2007 | Longsdorf et al. ........... 702/183 | JP | 06-248224 | 10/1994 | |
| | | | JP | 7-063586 | 3/1995 | |
| | FOREIGN PATENT DOCUMENTS | | JP | 07234988 | 9/1995 | |
| CN | 1185841 | 6/1998 | JP | 8-054923 | 2/1996 | |
| DE | 32 13 866 A1 | 10/1983 | JP | 8-102241 | 4/1996 | |
| DE | 35 03 597 | 7/1986 | JP | 08-114638 | 5/1996 | |
| DE | 35 40 204 C1 | 9/1986 | JP | 8-136386 | 5/1996 | |
| DE | 40 08 560 A1 | 9/1990 | JP | 8-166309 | 6/1996 | |
| DE | 43 43 747 | 6/1994 | JP | 8-247076 | 9/1996 | |
| DE | 44 33 593 A1 | 6/1995 | JP | 8-313466 | 11/1996 | |
| DE | 195 02 499 A1 | 8/1996 | JP | 2712625 | 10/1997 | |
| DE | 296 00 609 U1 | 3/1997 | JP | 2712701 | 10/1997 | |
| DE | 197 04 694 A1 | 8/1997 | JP | 2753592 | 3/1998 | |
| DE | 19930660 A1 | 7/1999 | JP | 07225530 | 5/1998 | |
| DE | 199 05 071 | 8/2000 | JP | 10-232170 | 9/1998 | |
| DE | 19905071 A1 | 8/2000 | JP | 11-083575 | 3/1999 | |
| DE | 299 17 651 U1 | 12/2000 | JP | 3139597 | 12/2000 | |
| DE | 199 47 129 | 4/2001 | RU | 2190267 C2 | 9/2002 | |
| DE | 100 36 971 A1 | 2/2002 | WO | WO 94/25933 | 11/1994 | |
| | | | WO | WO 95/23361 | 8/1995 | |

| | | |
|---|---|---|
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/50851 | 8/2000 |
| WO | WO 00/55700 | 9/2000 |
| WO | WO 00/70531 | 11/2000 |
| WO | WO 01/01213 A1 | 1/2001 |
| WO | WO 01/19440 | 3/2001 |
| WO | WO 01/77766 | 10/2001 |
| WO | WO 01/90704 A2 | 11/2001 |
| WO | WO 02/27418 | 4/2002 |
| WO | WO 03/081002 | 10/2003 |

OTHER PUBLICATIONS

U.S. Appl. No. 09/409,098, filed Sep. 30, 1999, Eryurek et al.
U.S. Appl. No. 09/799,824, filed Mar. 5, 2001, Rome et al.
U.S. Appl. No. 09/855,179, filed May 14, 2001, Eryurek et al.
U.S. Appl. No. 09/852,102, filed May 9, 2001, Eryurek et al.
U.S. Appl. No. 09/972,078, filed Oct. 5, 2001, Eryurek et al.
U.S. Appl. No. 10/635,944, filed Aug. 7, 2003, Huisenga et al.
"A TCP\IP Tutorial" by, Socolofsky et al., Spider Systems Limited, Jan. 1991 pp. 1-23.
"Approval Standards For Explosionproof Electrical Equipment General Requirements", Factory Mutual Research, C1. No. 3615, Mar. 1989, pp. 1-34.
"Approval Standard Intrinsically Safe Apparatus and Associated Apparatus For Use, Division 1 Hazardous (Classified) Locations", Factory Mutual Research, C1. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor For Piezoresistive Sensors" MCA Technologies Inc. (MCA7707), pp. 1-8.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.Feb. 1992, pp. 1-93.
"Fieldbus Standard for Use in Industrial Control Systems Part 3: Data Link Service Definition", ISA-S50.Feb. 1997, Part 3, Aug. 1997, pp. 1-159.
Fieldbus Standard For Use in Industrial Control Systems Part 4: Data Link Protocol Specification, ISA-S50.Feb. 1997, Part 4, Aug. 1997, pp. 1-148.
"Fieldbus Support For Process Analysis" by, Blevins et al., Fisher-Rosemount Systems, Inc., 1995, pp. 121-128.
"Fieldbus Technical Overview Understanding Foundation™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Technology Adoption into Automation" by, Fondl et al., Automation Business, pp. 1-5.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future For Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.
"Managing Devices with the Web" by, Howard et al., Byte, Sep. 1997, pp. 45-64.
"Modular Microkernel Links GUI And Browser For Embedded Web Devices" by, Tom Williams, pp. 1-2.
"PC Software Gets Its Edge From Windows, Components, and the Internet", Wayne Labs, I&CS, Mar. 1997, pp. 23-32.
Proceedings Sensor Expo, Anaheim, California, Produced by Expocon Managemnet Associates, Inc., Apr. 1996, pp. 9-21.
Proceedings Sensor Expo, Boston, Massachuttes, Produced by Expocon Management Associates, Inc., May 1997, pp. 1-416.
"Smart Sensor Network of the Future" by, Jay Warrior, Sensors, Mar. 1997, pp. 40-45.
"The Embedded Web Site" by, John R. Hines, IEEE Spectrum, Sep. 1996, p. 23.
"Transmission Control Protocol: Darpa Internet Program Protocol Specification" Information Sciences Institute, Sep. 1981, pp. 1-69.
"On-Line Statistical Process Control for a Glass Tank Ingredient Scale," by R.A. Weisman, *IFAC real Time Programming*, 1985, pp. 29-38.
"The Performance of Control Charts for Monitoring Process Variation," by C. Lowry et al., *Commun. Statis.—Simula.*, 1995, pp. 409-437.
"A Knowledge-Based Approach for Detection and Diagnosis of Out-Of-Control Events in Manufacturing Processes," by P. Love et al., *IEEE*, 1989, pp. 736-741.
"Advanced Engine Diagnostics Using Universal Process Modeling", by P. O'Sullivan, *Presented at the 1996 SAE Conference on Future Transportation Technology*, pp. 1-9.
Parallel, Fault-Tolerant Control and Diagnostics System for Feedwater Regulation in PWRS, by E. Eryurek et al., *Proceedings of the American Power Conference*.
"Programmable Hardware Architectures for Sensor Validation", by M.P. Henry et al., *Control Eng. Practice*, vol. 4, No. 10., pp. 1339-1354, (1996).
"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.
"Signal Processing, Data Handling and Communications: The Case for Measurement Validation", by M.P. Henry, *Department of Engineering Science, Oxford University*.
"Smart Temperature Measurement in the '90s", by T. Kerlin et al., *C&I*, (1990).
"Software-Based Fault-Tolerant Control Design for Improved Power Plant Operation," *IEEE/IFAC Joint Symposium on Computer-Aided Control System Design*, Mar. 7-9, 1994 pp. 585-590.
A Standard Interface for Self-Validating Sensors, by M.P. Henry et al., *Report* No. QUEL 1884/91, (1991).
"Taking Full Advantage of Smart Transmitter Technology Now," by G. Orrison, *Control Engineering*, vol. 42, No. 1, Jan. 1995.
"Using Artificial Neural Networks to Identify Nuclear Power Plant States," by Israel E. Alguindigue et al., pp. 1-4.
"Application of Neural Computing Paradigms for Signal Validation," by B.R. Upadhyaya et al., *Department of Nuclear Engineering*, pp. 1-18.
"Application of Neural Networks for Sensor Validation and Plant Monitoring," by B. Upadhyaya et al., *Nuclear Technology*, vol. 97, No. 2, Feb. 1992 pp. 170-176.
"Automated Generation of Nonlinear System Characterization for Sensor Failure Detection," by B.R. Upadhyaya et al., *ISA*, 1989 pp. 269-274.
"In Situ Calibration of Nuclear Plant Platinum Resistance Thermometers Using Johnson Noise Methods," *EPRI*, Jun. 1983.
"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer For Use Up to 1600° C", by M.J. de Groot et al., *Cal Lab*, Jul./Aug. 1996, pp. 38-41.

"Survey, Applications, And Prospects of Johnson Noise Thermometry," by T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68-88.

"Keynote Paper: Hardware Compilation-A New Technique for Rapid Prototyping of Digital Systems-Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report* No. QUEL 1912/92, (1992).

"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances In Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," IBM Technical Disclosure Bulletin, vol. 20, No. 5, pp. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6[Th]. WWW Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in A Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schröder, pp. 557-565 (1990).

"Fault Diagnosis of Fieldbus Systems," by Jürgen Quade, pp. 577-581 (Oct. 1992).
"Ziele und Anwendungen von Feldbussystemen," by T. Pfeifer et al., pp. 549-557 (Oct. 1987).
"PROFIBUS Infrastructure Measures," by Tilo Pfeifer et al., pp. 416-419 (Aug. 1991).
"Simulation the Time Behaviour of Fieldbus Systems," by O. Schnelle, pp. 440-442 (1991).
"Modélisation et simulation d'un bus de terrain: FIP," by Song et al, pp. 5-9 (undated).
"Field Bus Networks for Automation Systems Containing Intelligent Functional Unites," by W. Kriesel et al., pp. 486-489 (1987).
"Field Buses for Process Interconnection with Digital Control Systems," Tecnología, pp. 141-147 (1990).
"Decentralised Systems with Real-Time Field Bus," Netzwerke, Jg. Nr.3 v. 14.3, 4 pages (1990).
"Process Measurement and Analysis," by Liptak et al., Instrument Engineers' Handbook, Third Edition, pp. 528-530, (1995).
"Improving Dynamic Performance of Temperature Sensors With Fuzzy Control Techniques," by Wang Lei et al., pp. 872-873 (1992).
"Microsoft Press Computer Dictionary" 2nd Edition, 1994, Microsoft Press. p. 156.
International Search Report from Application No. PCT/US01/40791 with international filing date of May 22, 2001.
International Search Report from Application No. PCT/US01/40782 with international filing date of May 22, 2001.
International Search Report from Application No. PCT/02/14560 with international filing date of May 8, 2002.
International Search Report from Application No. PCT/US02/14934 with international filing date of May 8, 2002.
"On-Line Tool Condition Monitoring System With Wavelet Fuzzy Neural Network," by Li Xiaoli et al., pp. 271-276 (1997).
"Optimal Design of the Coils of An Electromagnetic Flow Meter," by Michalski, A. et al., IEEE Transactions on Magnetics, vol. 34, Issue 5, Part 1, pp. 2563-2566 (1998).
"Magnetic Fluid Flow Meter for Gases," Popa, N.C., IEEE Transactions on Magnetics, vol. 30, Issue 2, Part 1-2, pp. 936-938 (1993).
"New Approach to a Main Error Estimation for Primary Transducer of Electromagnetic Flow Meter," by Michalski, A., IEEE Instrumentation and Measurement Technology Conference Proceedings, vol. 2, pp. 1093-1097 (1998).
"Additional Information From Flowmeters Via Signal Analysis," by Amadi-Echendu, J.E. et al., IEEE Instrumentation and Measurement Technology Conference Record, vol. 7, pp. 187-193 (1990).
International Search Report from Application No. PCT/US02/06606 with international filing date of Mar. 5, 2002.
International Search Report from Application No. PCT/US02/30465 with international filing date of Sep. 25, 2002.
"What is a weighted moving average?", *DAU STAT Refresher, http://cne.gmu.edu/modules/dau/stat/mvavgs/wma*_bdy.html. (1995).
U.S. Appl. No. 10/675,014, filed Sep. 2003, Longsdorf et al.
U.S. Appl. No. 10/744,809, filed Dec. 2003, Brown et al.
"Statistics Glossary: Time Series Data", by Easton et al., http://www.stats.gla.ac.uk/steps/glossary/time_series.html, Sep. 1997.
"The Indicators Story", Sustainable Seattle, pp. 55-59, 1998.
"Detecting Regimes in Temperature Time Series", by Clemins et al., *Artificial Neural Networks in Engineering, Proceedings*, pp. 727-732, 2001.
"Re: Digital Filter-Moving Average", The Math Forumn, http://mathforum.org/discuss/sci.math/a/t/177212, Sep. 28, 1998.
U.S. Appl. No. 10/893,144, filed Jul. 2004, Brown et al.
"Notification of Transmittal of the International Search Report and the Written Opinion of the International Searching Authority", or the Declaration for PCT/US2004/017300.
"Invitation to Pay Additional Fees" for PCT/US2004/031678.
"Notification of Transmittal of The International Search Report or the Declaration", PCT/US2004/025291.
"Notification of Transmittal of The International Search Report or the Declaration", PCT/US2004/031678.
"Notification of Transmittal of The Internatinal Search Report or the Declaration", PCT/US2005/011385.
"Notification of Transmittal of the International Preliminary Report on Patenatability", PCT/US2004/031678.
"Notification of Transmittal of the International Search Report and Written Opinion" for PCT/US2007-012317.
Communication from EP Application No. 02725990.2-2209, dated Jun. 23, 2008.
Samson, Technical Information; HART Communication, Part 4 Communications; 40 pp.
"A Supervision Support System for Industrial Processes" by J. Penalva et al., IEEE, Oct. 1993, pp. 57-65.

\* cited by examiner

DEDICATED PROCESS DIAGNOSTIC DEVICE

BACKGROUND OF THE INVENTION

The present application is a Continuation-In-Part of and claims priority of U.S. patent application Ser. No. 10/801,073, filed Mar. 15, 2004, which is a Continuation-In-Part of U.S. application Ser. No. 09/852,102, now U.S. Pat. No. 6,907,383, which is a Continuation-In-Part of U.S. application Ser. No. 09/257,896, filed Feb. 25, 1999, abandoned which is a Continuation-In-Part of U.S. application Ser. No. 08/623,569, now U.S. Pat. No. 6,017,143, application Ser. No. 09/852,102 is also a Continuation-In-Part of U.S. application Ser. No. 09/383,828, now U.S. Pat. No. 6,654,697, which is a Continuation-In-Part of U.S. application Ser. No. 09/257,896, filed Feb. 25, 1999 which is a Continuation-In-Part of U.S. application Ser. No. 08/623,569, filed Mar. 28, 1996, now U.S. Pat. No. 6,017,143, the content of which is hereby incorporated by reference in its entirety.

The present invention relates to process control systems of the type used to monitor and/or control operation of industrial processes. More specifically, the present invention relates to diagnostics of such process control systems.

Field devices (devices such as process controllers, monitors and transmitters) are used in the process control industry to remotely control or sense a process variable. For example, a process variable may be transmitted to a control room by a transmitter for use in controlling the process or for providing information about process operation to a controller. For example, information related to pressure of process fluid may be transmitted to a control room and used to control the process, such as oil refining.

When a device used in industrial process fails, it is often necessary to shut down the entire process so that the failed device can be repaired or replaced. Typically, it is difficult to predict an impending failure of a process device prior to its occurrence. Thus, when the process device does fail, it occurs unexpectedly or with very little warning, and may require the unexpected shut down of the entire process. Although various attempts have been made at detecting and/or predicting a failure or impending failure, there is an ongoing need for such diagnostic techniques. Prior prediction of a pending failure allows the failing device to be replaced as desired prior to its ultimate failure.

SUMMARY

A field mountable dedicated process diagnostic device and method for use in diagnosing operation of an industrial control or monitoring system is provided. An input receives at least one process signal related to operation of the industrial process. A memory contains diagnostic program instructions configured to implement a diagnostic algorithm using the at least one process signal. The diagnostic algorithm may be specific to the industrial process in which the device or method is implemented. A microprocessor performs the diagnostic program instructions and responsively diagnoses operation of the process based upon the at least one process signal.

DETAILED DESCRIPTION

The present invention provides a dedicated process diagnostic device and method for use in diagnosing operation of an industrial process control or monitoring system. The dedicated process diagnostic device does not perform functions other than diagnostics in the process control system. In other words, the device is not used to measure a process variable used in performing or monitoring process control, and is also not used to control process operation. In some embodiments, in which the device is dedicated to performing diagnostics, its computational abilities can be substantially focused on this activity. The device can be configured to comply with requirements for mounting at a remote location in the field including intrinsic safety requirements and other requirements needed for the device to be "field hardened".

Figure 1:
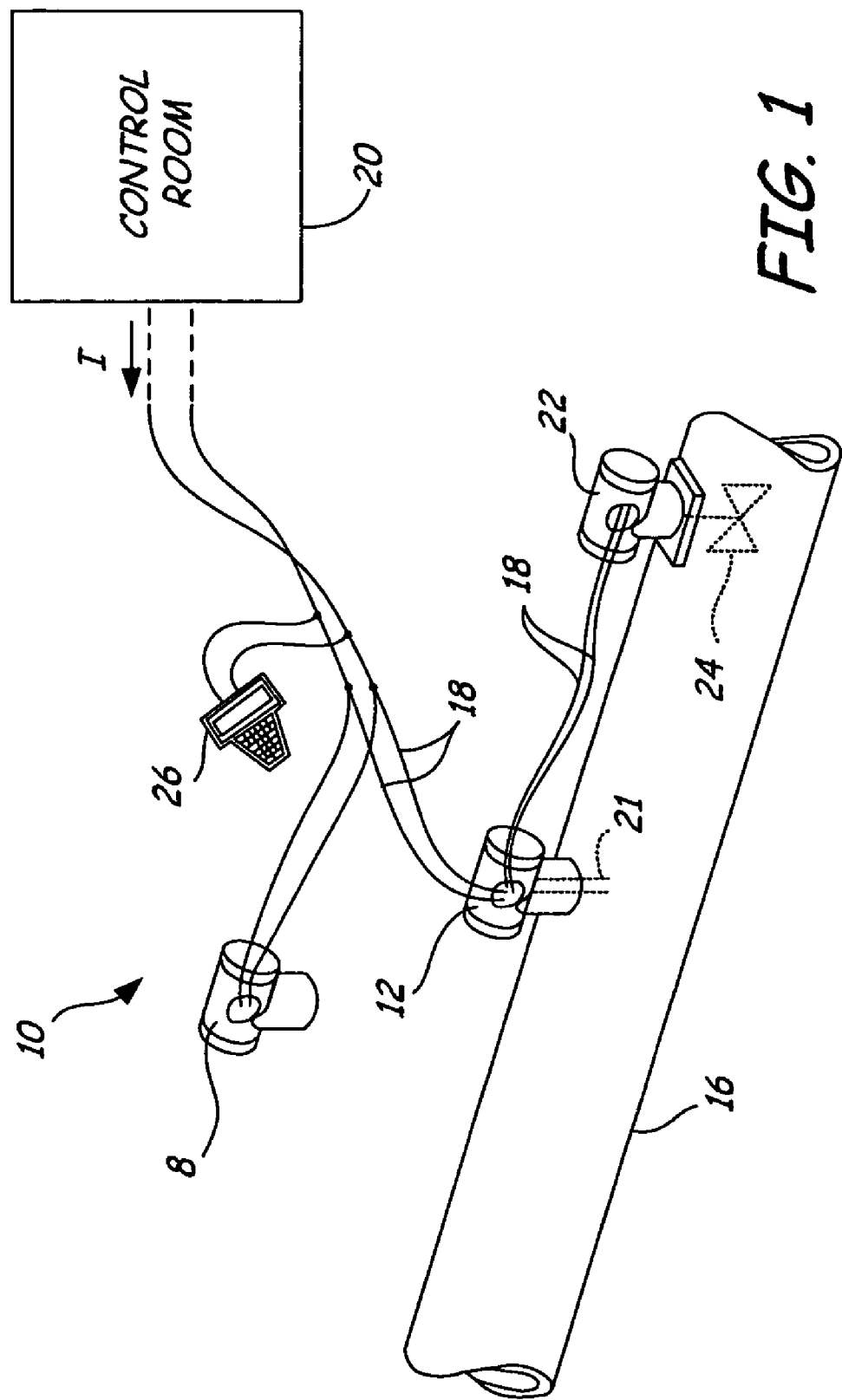
FIG. 1 is a simplified diagram of a process control system including a field mountable dedicated process diagnostic device.

FIG. 1 is a diagram of process control system 10 which includes dedicated field mounted diagnostic device 8. The process control system 10 also includes a transmitter 12 and a valve positioner 22 coupled to process pipe 16. A sensor 21 is shown generically in FIG. 1 and couples to transmitter 12. FIG. 1 also shows valve positioner 22 coupled to a control element 24 such as a valve. A process monitor 26 (illustrated as a hand held device) is also shown coupled to loop 18.

One typical technique for transmitting information involves controlling the amount of power flowing through a process control loop. Current is supplied from a current source in the control room and the transmitter controls the current from its location in the field. For example, a 4 mA signal can be used to indicate a zero reading and a 20 mA signal can be used to indicate a full scale reading. More recently, transmitters have employed digital circuitry which communicates with the control room using a digital signal which is superimposed onto the analog current signal flowing through the process control loop. One example of such a technique is the HART® communication protocol proposed by Rosemount Inc. The HART® protocol and other such protocols typically include a set of commands or instructions which can be sent to the transmitter to elicit a desired response, such as transmitter control or interrogation.

Fieldbus is a communications protocol proposed by the Fieldbus Foundation and is directed to defining a communications layer or protocol for transmitting information on a process control loop. In the Fieldbus protocol, the current flowing through the loop is not used to transmit an analog signal. Instead, all information is digitally transmitted. Further, the Fieldbus standard, and a standard known as Profibus, allow transmitters to be configured in a multi-drop configuration in which more than one transmitter is connected on the same process control loop. Other communication protocols include the MODBUS® protocol and Ethernet. In some configurations, two, three, four or any number of wires can be used to connect to the process device, including non-physical connections such as RF (radio frequency).

Diagnostic device 8, transmitter 12 and positioner 22 are coupled to a two-wire process control loop 18 which operates in accordance with the Fieldbus, Profibus or HART® standard. However, the invention is not limited to these standards or a two-wire configuration. Two-wire process control loop 18 runs between a location in the field and the control room

20. In an embodiment in which loop 18 operates in accordance with the HART® protocol, loop 18 can carry a current I which is representative of a sensed process variable. Additionally, the HART® protocol allows a digital signal to be superimposed on the current through loop 18 such that digital information can be sent to or received from transmitter 12. When operating in accordance with the Fieldbus standard, loop 18 carries digital signals and can be coupled to multiple field devices such as other transmitters. Any number of two wire process control loops 18 can be used and coupled to field mounted devices as appropriate. The configurations shown herein are for example purposes only.

Process variables are typically the primary variables which are being controlled in a process. As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal means, calibration values, alarms, alarm conditions, the signal which is provided to a control element such as a valve position signal which is provided to a valve actuator, an energy level which is provided to a heating element, a solenoid on/off signal, etc., or any other signal which relates to control of the process. A diagnostic signal as used herein includes information related to operation of devices and elements in the process control loop, but does not include process variables or control signals. For example, diagnostic signals include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter which may be detected or measured in the system. Furthermore, process signal means any signal which is related to the process or element in the process such as, for example, a process variable, a control signal or a diagnostic signal. Process devices include any device which forms part of or couples to a process control loop and is used in the control or monitoring of a process.

As discussed above, FIG. 1 is a diagram showing an example of a process control system 10 which includes process piping 16 which carries a process fluid and two wire process control loop 18 carrying loop current I. Transmitter 12, controller 22 (which couples to a final control element in the loop such as an actuator, valve, a pump, motor or solenoid), process monitor 26 and control room 20 are all part of process control loop 18. It is understood that loop 18 is shown in one configuration and any appropriate process control loop may be used such as a 4-20 mA loop, 2, 3 or 4 wire loop, multi-drop loop and a loop operating in accordance with the HART®, Fieldbus or other digital or analog communication protocol. In operation, transmitter 12 senses a process variable such as flow using sensor 21 and transmits the sensed process variable over loop 18. The process variable may be received by controller/valve actuator 22, diagnostic device 8, control room equipment 20 and/or process monitor 26. Controller 22 is shown coupled to valve 24 and is capable of controlling the process by adjusting valve 24 thereby changing the flow in pipe 16. Controller 22 receives a control input over loop 18 from, for example, control room 20 or transmitter 12 and responsively adjusts valve 24. In another embodiment, controller 22 internally generates the control signal based upon process signals received over loop 18. Process devices include, for example, transmitter 12 (such as a 3051S transmitter available from Rosemount Inc.), controller 22, a handheld process monitor 26, diagnostic device 8 and control room 20 shown in FIG. 1. Another type of process device is a PC, programmable logic unit (PLC) or other computer coupled to the loop using appropriate I/O circuitry to allow monitoring, managing, and/or transmitting on the loop.

Figure 2:
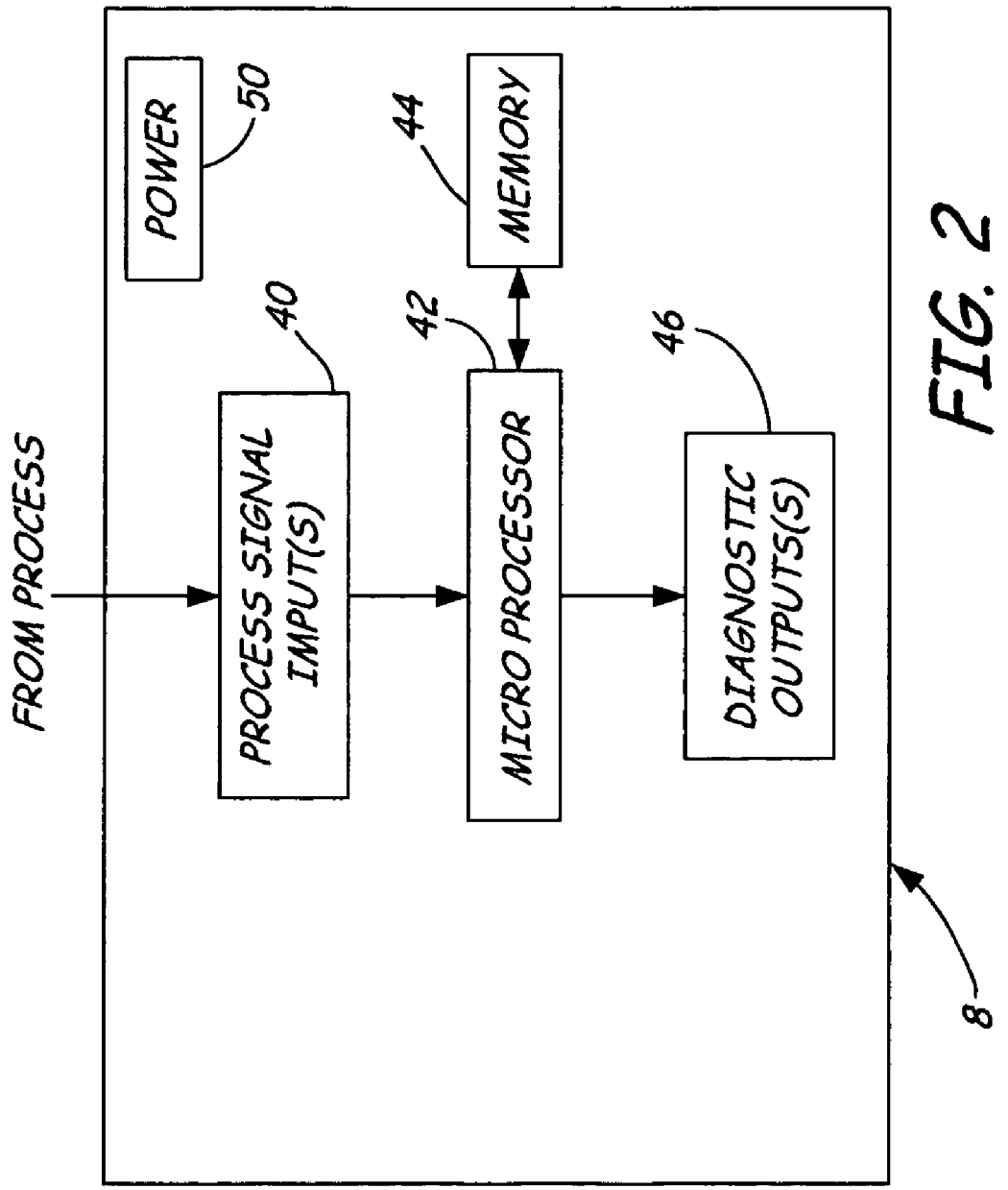
FIG. 2 is a block diagram of the field mountable dedicated process diagnostic device shown in FIG. 1.

FIG. 2 is a block diagram of field mounted dedicated diagnostic device 8. Device 8 is configured to couple to the process control system 10 of FIG. 1 and includes a process signal input 40 configured to receive one or more process signals from the process control system 10. A microprocessor 42 receives the process signals and is coupled to a memory 44. The memory 44 contains diagnostic program instructions configured to implement a diagnostic algorithm in the microprocessor 42. The diagnostic algorithm uses at least one process signal received by input 40 from the process. The diagnostic algorithm which is implemented in the microprocessor is specific to the particular process and configuration being monitored. For example, algorithms used to monitor operation of a process which controls level of process fluid in a tank may be different than the algorithm used to diagnose operation of a control system process which controls flow of process fluid through a pipe. Based upon the algorithm and this process signal, the microprocessor 42 provides some type of diagnostic output 46. The diagnostic output 46 can be an output used only internally by the device 8, or can be an output which is transmitted to a remote location, for example over the process control loop 18 shown in FIG. 1. Device 8 also includes a power supply 50 which, in some embodiments, is configured to receive power from the two wire process control loop 18 for completely powering all electrical components within device 8.

In general, the present invention offers a new class of field mountable process device which is used to monitor process conditions, detect process abnormalities and changes and provide diagnostics related to process operation and optimization. There is an ongoing need to increase the productivity, improve quality, lower costs and comply with regulations in industrial processes. Typical process devices do not have the computational ability to support the addition of complex diagnostics. This limitation is due to power constraints, and requirements for field hardening of the device to withstand hazardous locations and harsh environmental conditions. By using a dedicated device to perform diagnostics, the limited resources of the dedicated process diagnostic device can be focused on the single task of performing diagnostics and not required to perform other process related tasks. The dedicated device provides an operator functionality to monitor process conditions and signatures, trends, changes, upsets or other abnormalities which can be analyzed and used to troubleshoot system operation. The diagnostic information can then be communicated to a host system for use as appropriate, including a controlled plant shutdown. Further, by using a dedicated process device rather than a device located in the control room to implement diagnostics, the dedicated device has access to real time process information. In contrast, when equipment located at a remote location, such as the control room, is used to perform diagnostics, the diagnostic capabilities are limited because the remote equipment has limited access to process signals. For example, control room equipment has limited input/output capabilities, limited scan or update times, and limited bandwidth. Field hardening of the device allows operation in hazardous environments or in environments in which the device is subjected to a harsh conditions. Preferably, the device operates using sufficiently low power consumption to allow operation using power completely received from a two wire process control loop. However, in some embodiments, other configurations are used such as a four wire configuration. The memory 44 can be used to provide additional capabilities such as logging, trending, and analysis. The dedicated device 8 can also be used for testing diagnostic algorithms and techniques prior to adding such functionality to other process devices. The process signals used by device 8 can be received by monitoring transmissions on the process control loop. However, process signals can also be received through dedicated sensors directly coupled to the diagnostic device 8. The diagnostics performed by the device can be based on additional information, for example control information such as a setpoint, valve position, or the like, to perform higher level loop or device specific diagnostics. The device 8 can provide multiple types of diagnostic outputs, either individually or together, including annunciations, alarm signals, control signals, etc. Communication with the process device can be through the process control loop using standard communication techniques or can be through other techniques including wireless communications or using web connectivity.

Figure 3:
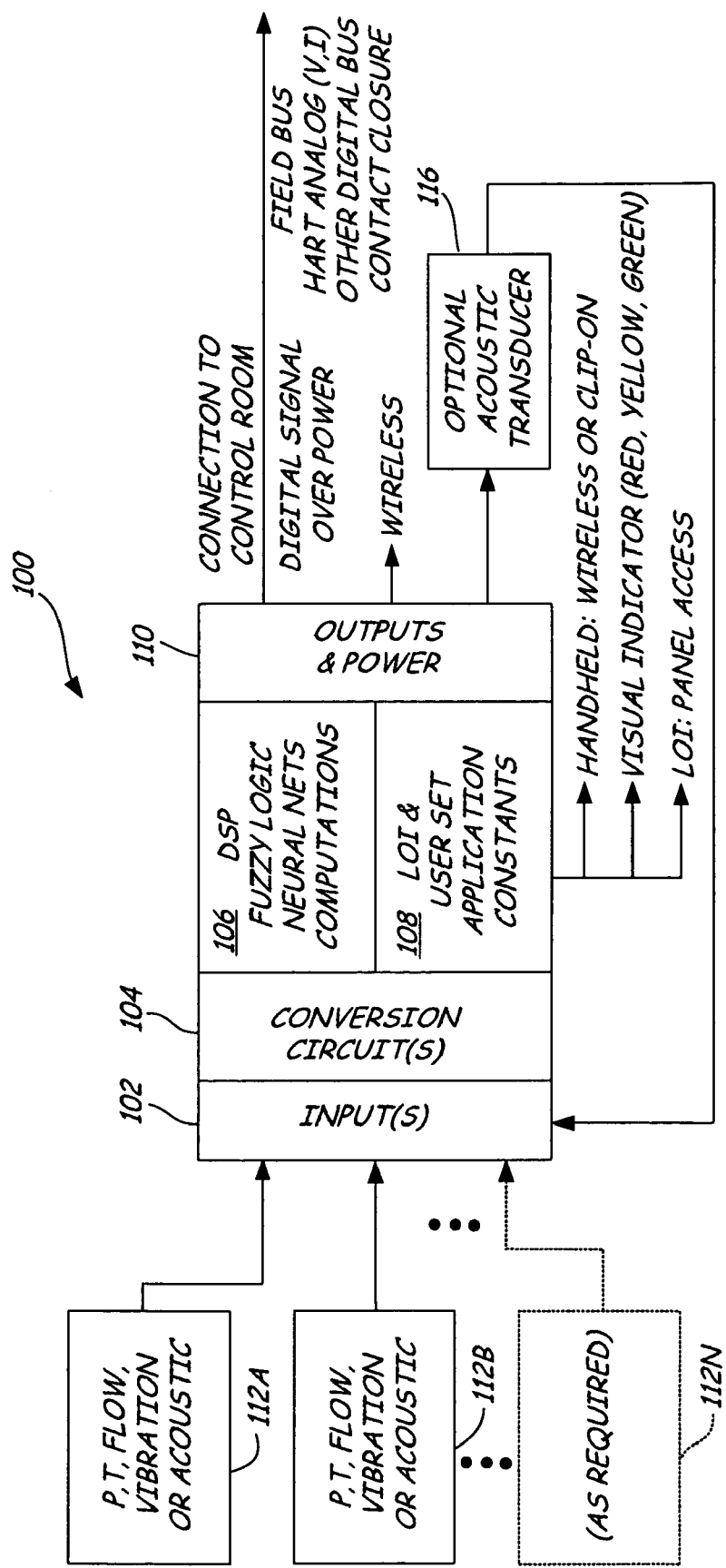
FIG. 3 is a block diagram of the field mounted diagnostic device.

FIG. 3 is a block diagram of an example embodiment of a dedicated field mounted process diagnostic device 100. Device 100 generally includes input(s) 102, conversion circuit(s) 104, computational circuitry 106, application specific data 108 and output circuitry 110. Input(s) 102 can couple to any number of diagnostic sensors 112A, 112B . . . 112N. The sensors can be dedicated sensors which are directly coupled to device 100, or can be sensors coupled to device 100 through a databus such as a process control loop. The diagnostic variable sensors 112A-112N can measure any variable related to operation of the process or devices associated with the process. In the example of FIG. 3, diagnostic sensors are shown as providing pressure, temperature, flow, vibration or acoustic signals. The connection between the diagnostic sensors and the input block 102 of device 100 can be through a databus so that the sensors are located remotely, or through a direct connection. The databus can be any type of databus, for example, a two wire process control loop. Further, other types of databuses can be used such as a CAN bus, an SPI bus, etc. The conversion circuitry 104 is used as required to convert received process signals into a format suitable for use by computation circuitry 106. The computation circuitry 106 is illustrated as providing digital signal processing, fuzzy logic, neural networks or other computations. However, the circuitry can perform a desired form of a diagnostic computation. Application data 108 can be stored in a memory and can be set using an LOI (Local Operator Interface) or other technique to provide set application specific constants. For example, the data can be downloaded over a process control loop sent using a wireless communication link, configured using a web interface, or through the other techniques. Output circuitry 110 is illustrated as including a connection to the control room for providing digital, or analog signals. Examples include Fieldbus, HART®, analog data, digital data, contact closures or the like. A wireless communication output can also be provided. An optional acoustic transducer 116 is illustrated. The acoustic transducer 116 can be used to obtain additional diagnostic information, for example by applying a acoustic signal to a process component and observing the response through input circuitry 102.

The diagnostic device 100 is configured for a location in the field near the equipment or process that is being monitored for aberrant activity. The device 100 can be connected to existing process variable measurement devices, and/or other sensors that monitor other variables useful for performing a diagnostic function. The output of the diagnostic device 100 can be configured as desired. Example outputs include a local output to a handheld device such as a wireless or clip-on device. A visual indicator can also be provided, for example providing a color coded output with red indicating an alarm condition, yellow indicating a caution condition and green indicating nominal operation. The output can also be provided over an Internet connection, or through the connection to the control room. A Local Operation Interface (LOI) can also be provided for use in configuring the device and/or for providing a diagnostic output.

Figure 4:
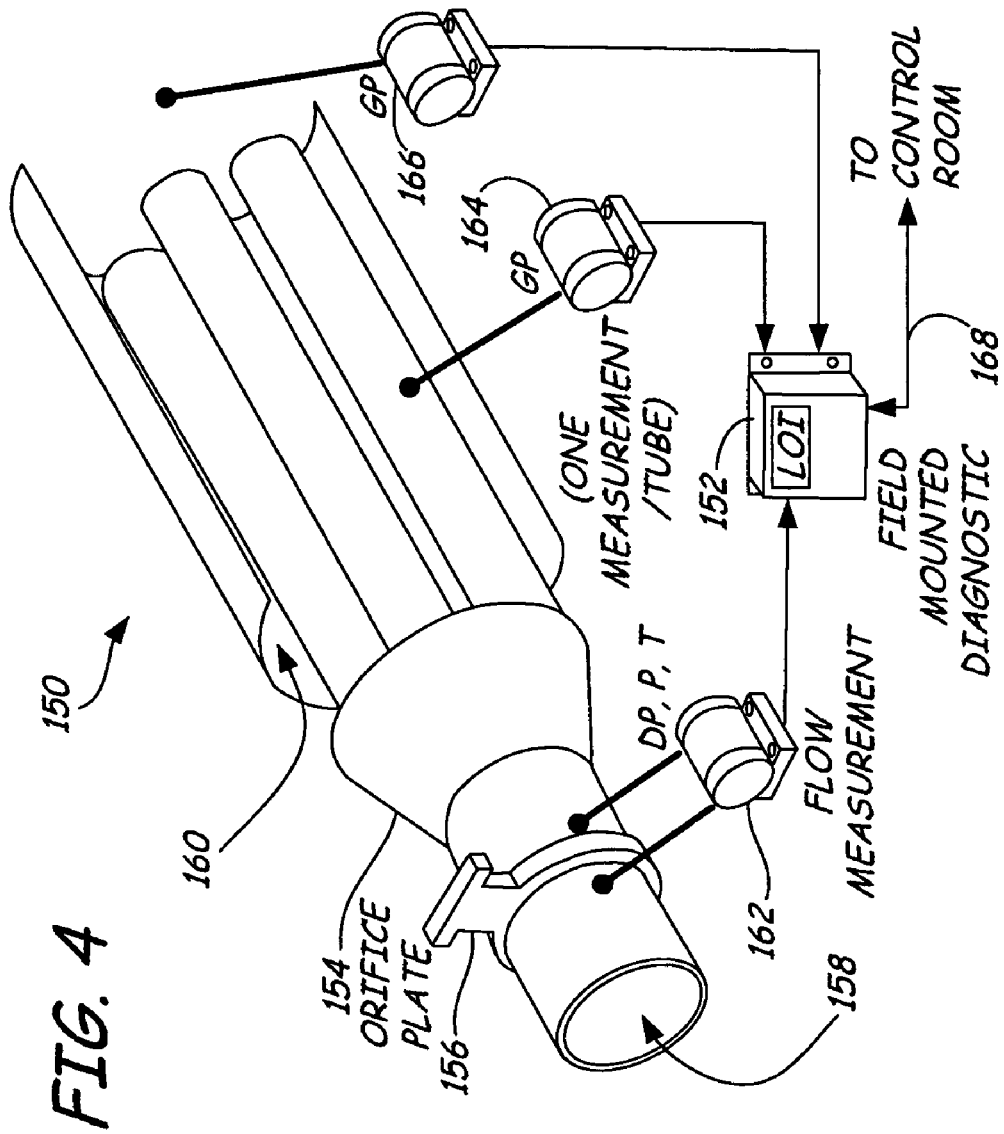
FIG. 4 is a diagram of a field mounted diagnostic device used in conjunction with a heat exchanger.

FIG. 4 is a simplified schematic diagram of a heat exchanger system 150 including a dedicated field mounted diagnostic device 152. System 150 includes heat exchanger 154 having an orifice plate 156, a primary flow input 158 and a counter flow 160. A flow measurement transmitter 162 is shown coupled across the orifice plate 156 and is configured to measure differential pressure, gage or absolute pressure and temperature. The output from transmitter 162 is received by diagnostic device 152. Additionally, transmitters 164 and 166 are illustrated as measuring gauging pressure along heat exchanger system 150. Field mounted diagnostic device 152 also monitors the gauge pressure measurement from transmitters 164 and 166. A two wire process control loop connection 168 is shown which couples diagnostic device 152 to a remote control room. During operation, the diagnostic device 152 can monitor the various process variables. For example, the differential pressure across the flow tubes in the heat exchanger can be monitored by observing the difference between the gauge pressures measured by transmitter 164 and transmitter 166. Given mass flow rate measured by transmitter 162, an expected differential pressure between gauges 164 and 166 can be calculated by diagnostic device 152. If the tubing within heat exchanger 154 becomes clogged, the expected differential pressure measured between transmitters 164 and 166 will deviate from the expected value. This can be used to trigger a diagnostic indication for local output, or transmission to the control room. Typically, the tubes within the heat exchanger 154 do not become plugged at the same rate. The gauge pressure measurement transmitters 164 and 166 can be used to measure pressures along the length of the exchanger tubing. Transmitters 164 and 166 can also be used to identify tubes that are plugging at a faster rate than others. This allows for maintenance to be correlated with the severity of the plugging. For example, a group of tubes which are completely plugged will cause a pressure drop across the entire heat exchanger tube group and may need immediate cleaning. On the other hand, an even build up among all of the tubing may cause the same pressure drop but may not require immediate attention.

FIG. 4 is one example embodiment and the present invention is applicable to all types of process control systems. Other examples include exchangers of all types, reactors, process overflow and leakage detection, cavitation sensing and/or prediction, corrosion monitoring, wear monitoring, identification of process operation which is outside particular limits, or other specialized applications.

The field mounted diagnostic device provides a co-located, dedicated diagnostic capability to determine whether abnormal conditions in the process exist, and if so, to what extent. The device can accept many types of sensor inputs and can be cognizant of information carried on the process control loop, such as setpoint information, to reduce inaccuracies in the diagnostics. The device can be configurable through sensor selection and software to accommodate many different types of diagnostic application requirements. The device is capable of local access and interrogation due to the co-location with the target system under diagnostic. Local output diagnostics can be used in physical observations of the system by an operator. The device need only monitor sensors and process variables required for the particular system which is being observed. The device can provide multiple outputs for viewing alarms and supporting of an appropriate level of detail as desired. Similar devices can be used for many different applications through the use of different software configurations. The device can be monitored over existing networks including communications through modems or the like. Preferably, the diagnostic device is physically hardened for field mounted applications. In such a configuration, the device should be able to withstand vibrations, caustic chemicals, electrostatic discharges, etc. for a particular installation. The output from the device can be in the form of a transmission to a remote location using wired or wireless techniques, a local output, outputs that support virtual web pages or transmission through the Internet, or other types of output. Any type of diagnostic technique can be used within the device including fuzzy logic techniques, neural network techniques, rule based techniques or the like. The device can also be configured to provide a particular input or stimulus to the process, such as through the application of an acoustic signal. Sensors within the device can monitor the response of components to the applied signal and the response can be used for the diagnostics performed by the device.

Although the present invention has been described with reference to preferred embodiments, workers skilled in the art will recognize that changes may be made in form and detail without departing from the spirit and scope of the invention. As used herein, "diagnostic sensors" are sensors which are dedicated to obtaining diagnostic measurements and are not used in controlling the process. Further, in some embodiments, program instructions which are performed by the microprocessor have the capability of learning operation of the monitored process by monitoring operation of the process.

What is claimed is:

1. A field mountable dedicated process diagnostic device coupled to a process control loop for use in diagnosing operation of an industrial control or monitoring system of an industrial process, comprising:
   an input configured to receive at least one process signal related to operation of the industrial process from a diagnostic sensor;
   a memory in the field mountable dedicated process diagnostic device containing diagnostic program instructions configured to implement a plurality of diagnostic algorithms, using the at least one process signal and wherein the at least one of the plurality of diagnostic algorithms is specific to the industrial process wherein the plurality of diagnostic algorithms include at least two diagnostic algorithms each of which are specific to different industrial processes;
   a selection input configured to receive diagnostic algorithm selection data indicative of a type of the industrial process and which identifies one of the at least two diagnostic algorithms and thereby selects a diagnostic algorithm; and
   a microprocessor configured to perform the diagnostic program instructions and responsively diagnose operation of the industrial process based upon the at least one process signal and the selected diagnostic algorithm.

2. The apparatus of claim 1 wherein the dedicated process diagnostic device is completely powered with power received over a two wire process control loop.

3. The apparatus of claim 1 wherein the process control loop comprises a 4-20 mA current loop.

4. The apparatus of claim 1 wherein the process control loop operates in accordance with the HART® Communication Standard.

5. The apparatus of claim 1 wherein the process control loop operates in accordance with the Fieldbus Communication Standard.

6. The apparatus of claim 1 wherein the input is configured to receive at least one input from a process variable sensor.

7. The apparatus of claim 1 wherein the process signal is received from the two wire process control loop.

8. The apparatus of claim 1 wherein the input is configured to receive a process signal from a diagnostic sensor directly coupled to the field mountable dedicated process diagnostic device.

9. The apparatus of claim 1 including a conversion circuit configured to convert the process signal to a format compatible with the microprocessor.

10. The apparatus of claim 1 including an output configured to provide a wireless output.

11. The apparatus of claim 1 including a visual output.

12. The apparatus of claim 1 including a Local Operator Interface.

13. The apparatus of claim 1 including an acoustic transducer.

14. The apparatus of claim 1 wherein the industrial process comprises a heat exchanger process and the diagnostic program instructions are specific to the heat exchanger process.

15. The apparatus of claim 1 wherein the diagnostic program instructions are configured to learn operation of the process.

16. The apparatus of claim 1 wherein the diagnostic sensor comprises a vibration sensor and wherein the diagnostic algorithm is specific to diagnosing operation of a heat exchanger.

17. The apparatus of claim 1 wherein the configuration input comprises a local operator interface.

18. The apparatus of claim 1 wherein the selection input comprises a wireless input.

19. The apparatus of claim 1 wherein the selection input is received through the process control loop.

20. A method of diagnosing operation of an industrial control or monitoring system of an industrial process performed in a field mountable dedicated process diagnostic device, comprising:
   mounting the field device in a field of the industrial process;
   storing diagnostic program instructions in a memory which are configured to implement a plurality of diagnostic algorithms, at least one of the plurality of diagnostic algorithms is specific to the industrial process and responsive to the process signal, wherein the plurality of diagnostic algorithms include at least two diagnostic algorithms each of which are specific to different industrial processes;
   receiving at least one process signal related to operation of the industrial process from a remote process device;
   receiving a selection input configured to receive diagnostic algorithm selection data indicative of a type of the industrial process and which identifies one of the at least two diagnostic algorithms and thereby selects a diagnostic algorithm;

retrieving diagnostic program instructions from the memory located in the field mountable dedicated process diagnostic device which implement the selected diagnostic algorithm;

diagnosing operation of the industrial process based upon the retrieved program instructions and the selected diagnostic algorithm;

providing an output related to the diagnosing; and completely powering the field mountable dedicated diagnostic device with power received from a two wire process control loop.

21. The method of claim 20 wherein the two wire process control loop comprises a 4-20 mA current loop.

22. The method of claim 20 wherein the two wire process control loop operates in accordance with the HART® Communication Standard.

23. The method of claim 20 wherein the two wire process control loop operates in accordance with the Fieldbus Communication Standard.

24. The method of claim 20 wherein the at least one process signal comprises a process variable signal.

25. The method of claim 20 including converting the process signal to a format compatible with a microprocessor.

26. The method of claim 20 including providing a wireless output.

27. The method of claim 20 including providing a visual output.

28. The method of claim 20 including providing a Local Operator Interface.

29. The method of claim 20 including receiving the process signal from an acoustic transducer.

30. The method of claim 20 wherein the industrial process comprises a heat exchanger process and the diagnostic program instructions are specific to the heat exchanger process.

31. The method of claim 20 wherein the diagnostic program instructions are configured to learn operation of the process.

32. A field mountable diagnostic device for diagnosing operation of an industrial control or monitoring system of an industrial process, comprising:

means for receiving at least one process signal related to operation of the industrial process from a remote process device;

memory means located in the field mountable dedicated process diagnostic device for storing diagnostic program instructions in a memory which are configured to implement a plurality of diagnostic algorithms, at least one of the plurality of diagnostic algorithms is specific to the industrial process and responsive to the process signal, wherein the plurality of diagnostic algorithms include at least two diagnostic algorithms each of which are specific to different industrial processes;

means for receiving diagnostic algorithm selection data indicative of a type of the industrial process and which identifies one of the at least two diagnostic algorithms and thereby selecting a diagnostic algorithm;

means for retrieving diagnostic program instructions which implement the at least one diagnostic algorithm;

means for diagnosing operation of the industrial process based upon the retrieved program instructions and the selected diagnostic algorithm; and means for completely powering the field mountable dedicated diagnostic device with power received from a two wire process control loop.

* * * * *